United States Patent
Odashima

[11] Patent Number: 6,145,322
[45] Date of Patent: Nov. 14, 2000

[54] CRYOGENIC COUPLER

[75] Inventor: Yutaka Odashima, Tokyo, Japan

[73] Assignee: The University of Tokyo, Tokyo, Japan

[21] Appl. No.: 09/322,199

[22] Filed: May 28, 1999

[30] Foreign Application Priority Data

May 29, 1998 [JP] Japan ................................. 10-148635

[51] Int. Cl.$^7$ ................................................. F25B 19/00
[52] U.S. Cl. ........................ 62/50.7; 251/149.6; 285/47; 285/904
[58] Field of Search ............................. 62/50.7; 285/47, 285/904; 251/149.6

[56] References Cited

U.S. PATENT DOCUMENTS

| | | | |
|---|---|---|---|
| 4,250,713 | 2/1981 | Germann | 285/47 |
| 5,265,844 | 11/1993 | Westfall | 62/50.7 |
| 5,450,875 | 9/1995 | Chichester et al. | 251/149.6 |

FOREIGN PATENT DOCUMENTS 1-82391  6/1989  Japan.

*Primary Examiner*—Ronald Capossela
*Attorney, Agent, or Firm*—Knobbe, Martens, Olson & Bear, LLP

[57] ABSTRACT

A cryogenic coupler includes a socket and a plug that can be detachably inserted into the socket. The socket and the plug have passages for passing a cryogenic medium therethrough, and are provided with valves for blocking the respective passages when the plug is disconnected from the socket. A seal assembly is arranged between opposite end surfaces of the socket and the plug. The seal assembly has a resilience characteristic that is substantially uninfluenced by the cryogenic temperature, and thus prevents leakage of the cryogenic medium to outside, when passages in the socket and the plug are connected to each other. The coupler allows a facilitated connection and disconnection of the passages, even under a low temperature condition.

8 Claims, 9 Drawing Sheets

FIG.6a
FIG.6b
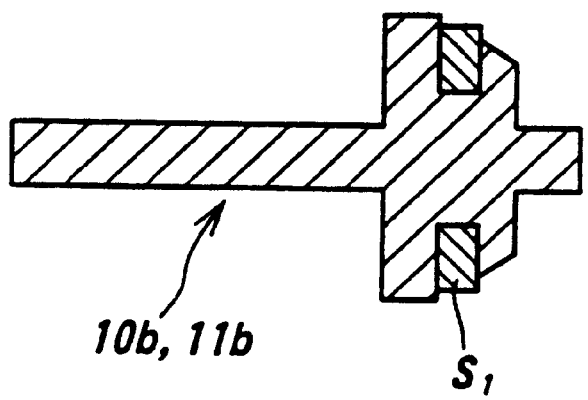
10b, 11b
$S_1$
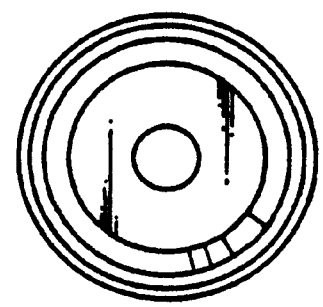

13c
6.5φ
14.3φ t=0.4
t=0.2

CRYOGENIC COUPLER

BACKGROUND OF THE INVENTION

1. Field of the Invention

The present invention relates to a cryogenic coupler which can be advantageously used to achieve connection and disconnection of passages for a cryogenic medium, such as liquefied helium or liquefied nitrogen, that is to be delivered to a desired location.

2. Description of the Related Art

A cryogenic medium, such as liquefied helium or liquefied nitrogen, is typically under a low temperature within the range of 20–100K. When such cryogenic medium is delivered to a desired location, pipes are used which are formed of a material capable of effectively withstanding the low temperature. Generally, the pipes are connected to each other at the flanges on opposite ends thereof, with bolts and nuts.

The pipe connection with flanges is associated with the problems that, not only the connecting or disconnecting operation is troublesome, but also the disconnection of the pipes is impossible unless the cryogenic medium in the pipe is discharged and the temperature is then allowed to rise to around 260K.

In recent years, couplers of the type shown in FIG. 1 have come to be used, which are designed so that the flow passages can be readily connected or disconnected by a one-touch operation. This type of coupler comprises a socket 2 provided with an interior passage 1 which is in communication with a pipe for the supply medium, and a plug 4 which is removably inserted into an opening 2a at one side of the socket 2 and provided with a passage 3 to be communicated with the passage 1. In use, a sleeve 5 on the outer periphery of the socket 2 is caused to slide against the counter-force of a spring S which is arranged on the inner side of the sleeve 5, so that the free end of the plug 4 can be inserted into, or removed from the opening 2a of the socket 2. The sleeve 5 is then returned by the spring S to its initial position, thereby completing the connection or disconnection of the passages for the supply medium. Such a design makes it possible efficiently to achieve the connection or disconnection of the passages, in a facilitated and reliable manner. This type of coupler is typically provided with check valves 6, 7 in the passages 1, 3, which serve to prevent leakage of the supply medium from the socket 2 and the plug 4 even under the presence of the supply medium in the pipes extending to the plug 4 or to the socket 2. This is because the valve bodies 6a and 7a of the check valves are automatically urged against the inner walls of the socket 2 and the plug 4, respectively, by the operation of springs 8 and 9, after the passages have been disconnected from each other.

The conventional coupler described above uses an O-ring P as a seal element between the socket and the plug, for preventing leakage of the supply medium. However, the resilience of the O-ring P tends to be lost due to the shrinkage particularly when the coupler is used under the cryogenic temperature condition. Therefore, it is again difficult to connect or disconnect the socket and the plug to or from each other, unless the supply medium in the passage is removed and the temperature is then allowed to rise to around 260K, as in the case of the abovementioned flanged pipe connection. The duty range of the conventional coupler is from −20° C. to +180° C. in temperature and around 5 MPa in normal pressure, and there are no couplers known at present, that can be used at a lower temperature range.

DISCLOSURE OF THE INVENTION

It is an object of the present invention to provide an improved cryogenic coupler capable of achieving connection or disconnection even under a low temperature condition, in a facilitated and reliable manner and without leakage of the supply medium.

According to the present invention, there is provided a cryogenic coupler which comprises: a socket having a first passage for a cryogenic medium passage, and an opening at one end thereof; a plug which can be inserted into said opening and thereby detachably connected to the socket, said plug having a second passage which is communicated with said first passage when the plug is connected to the socket; a first valve provided for the socket, for blocking the first passage when the plug is disconnected from the socket; a second valve provided for the plug, for blocking the second passage when the plug is disconnected from the socket; and a seal assembly arranged between opposite end surfaces of the socket and the plug in said opening, for preventing leakage of the cryogenic medium from said passages to outside when the plug is connected to the socket.

The present invention eliminates use of an O-ring that is significantly influenced by the temperature of the supply medium. Instead, a seal assembly is arranged between the opposite end surfaces of the plug and the socket, and has a resilience characteristic that is substantially uninfluenced by the cryogenic temperature. Thus, the socket and the plug of the coupler can be connected to, or disconnected from each other without any problems even at a low temperature condition, in a facilitated and highly reliable manner.

Incidentally, when the socket and the plug of the coupler are to be connected to each other with the seal assembly placed in position, the fastening force required would be the greater as the tightening allowance increases. In this instance; the socket and the plug may be held by respective clamps and connected together while being gradually compressed toward each other.

Advantageously, the seal assembly comprises first and second resin seal rings which are engageable with the opposite end surfaces of the socket and the plug, respectively, and a metal seal ring arranged between, and adjacent to, the first and second resin seal rings.

In this instance, it is preferred that the first and second resin seal rings comprises fluorine type resin, and/or the metal seal ring comprises stainless steel, copper or copper alloy.

Preferably, the metal seal ring has a surface provided with an annular ridge which is engageable with one of the first and second resin seal members. In this instance, the metal seal ring has an opposite surface which may be provided with an annular groove so that the annular groove is engageable with the other of the first and second resin seal members.

Preferably, the seal assembly further comprises a retainer ring engaged with an inner peripheral surface of the opening, in the socket for retaining the seal rings in the opening. The retainer ring may comprise either resin or metal.

BRIEF DESCRIPTION OF THE DRAWINGS

The present invention will be further described below with reference to the accompanying drawings, in which:

FIGS. 6a and 6b are longitudinal sectional view and front view of the valve body, respectively;

DESCRIPTION OF THE PREFERRED EMBODIMENT

Figure 1:
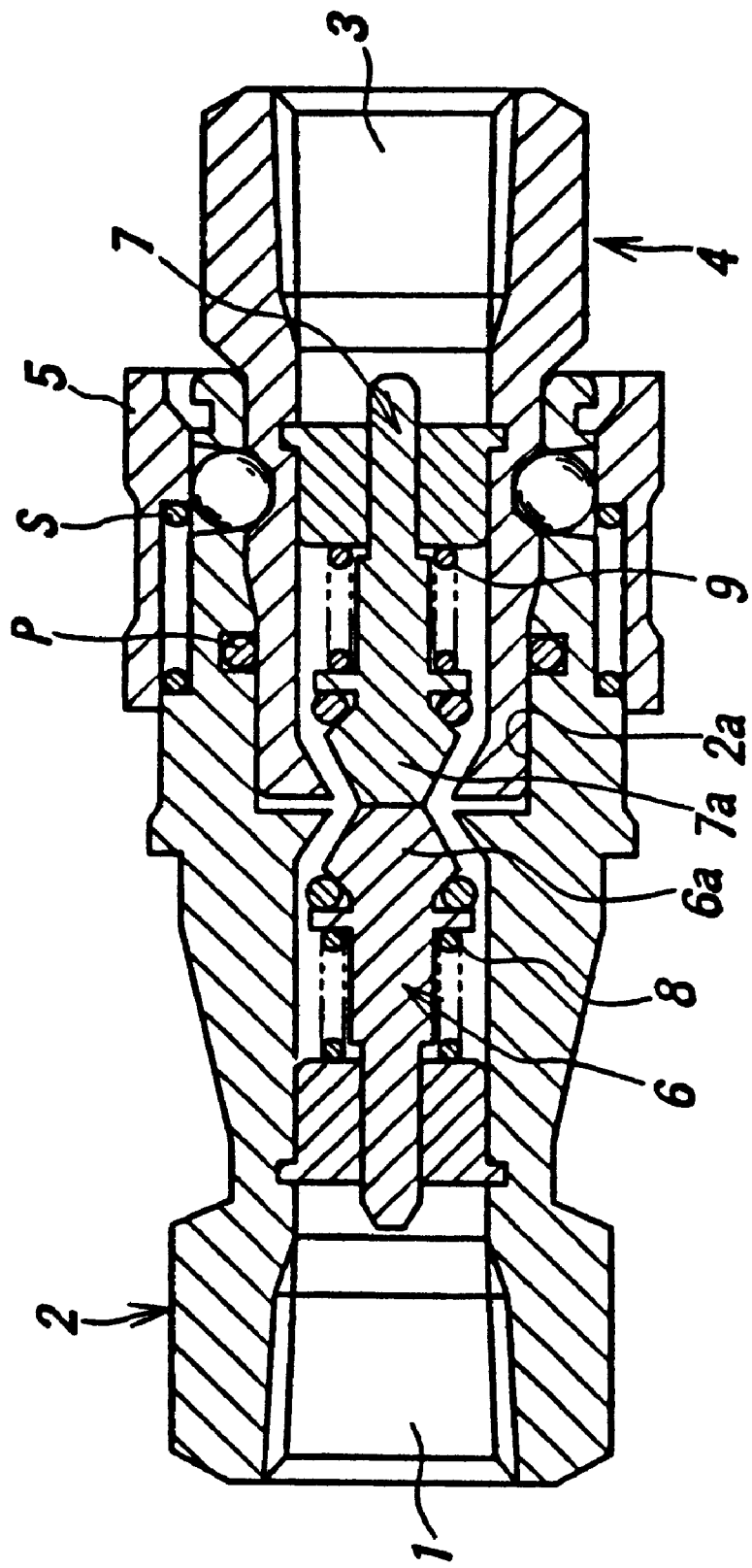
FIG. 1 is a sectional view showing a conventional coupler.
Figure 2:
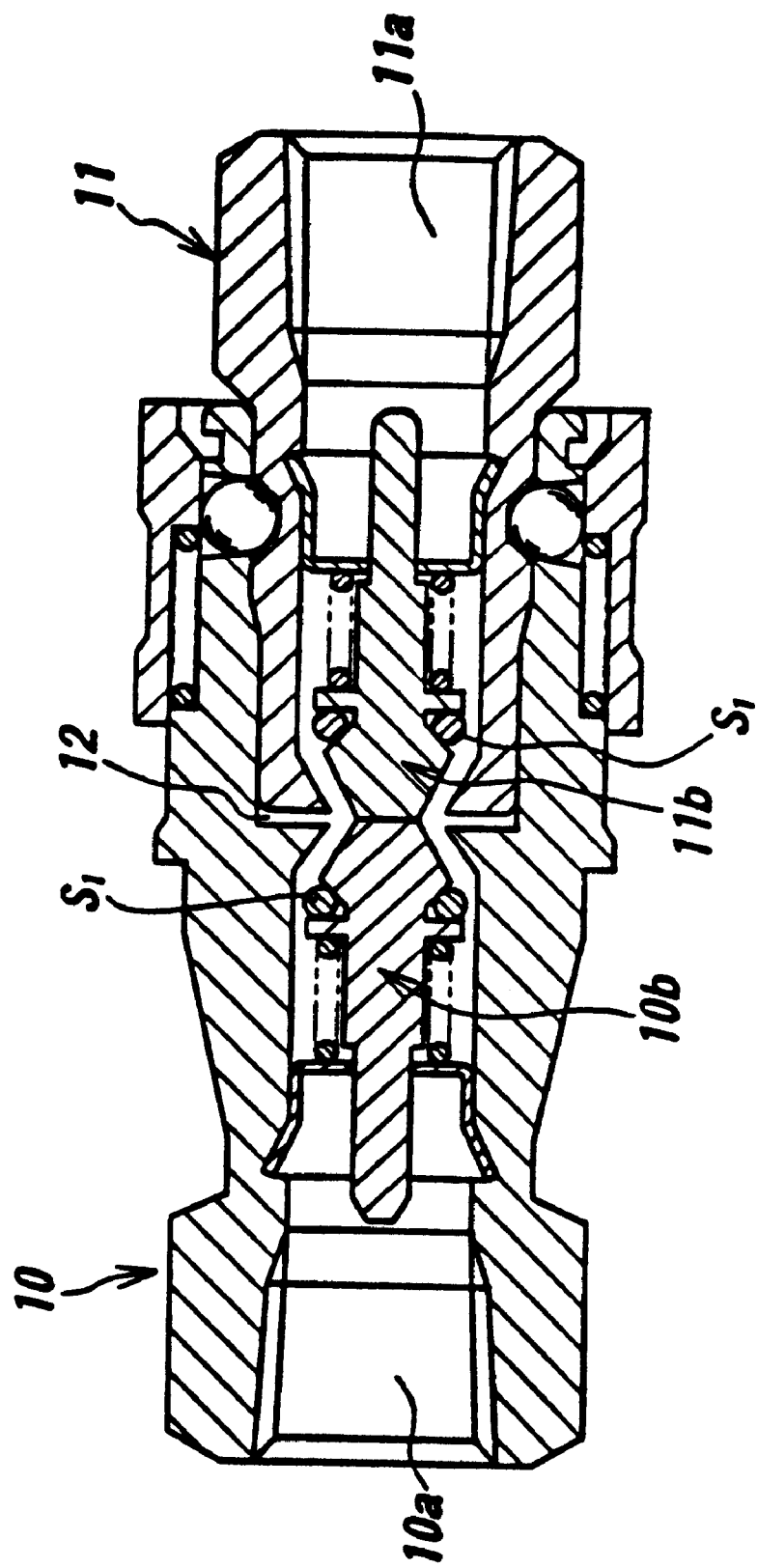
FIG. 2 is a sectional view showing one embodiment of the cryogenic coupler according to the present invention.

Referring now to FIG. 2, there is shown an overall structure of the cryogenic coupler according to one embodiment of the invention. The cryogenic coupler according to the invention includes a socket 10 and a plug 11, which can be connected to, or disconnected from each other in essentially the manner as those in the conventional coupler which has been described above with reference to FIG. 1.

Thus, the socket 10 has a passage 10a which is connected to a supply medium passage, and a valve 10b for blocking the passage 10a when the socket 10 is disconnected from the plug 11. The plug 11 is detachably received in a substantially cylindrical opening at one end of the socket 10, and has a passage 11a which is communicated to the passage 10a. Similar to the socket 10, the plug 11 also has a valve 11b for blocking the passage 11a when the plug 11 is disconnected from the socket 10.

Figure 3:
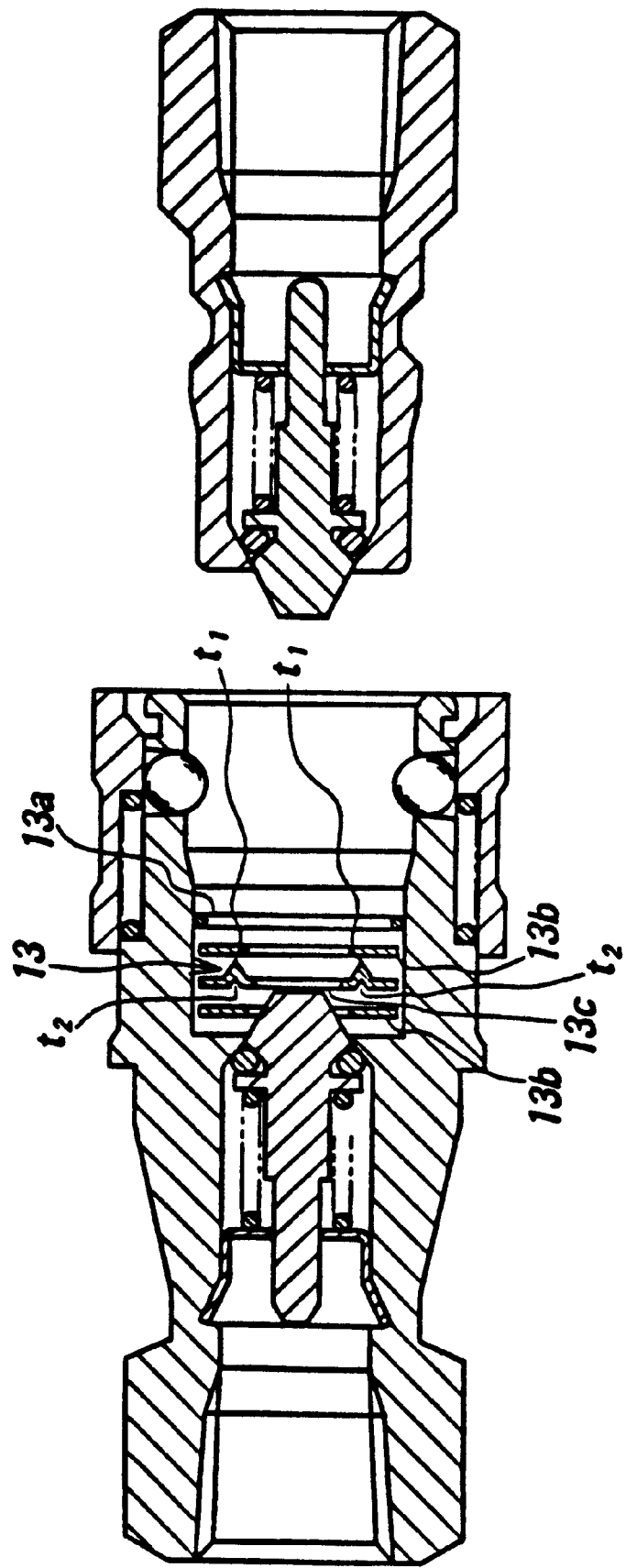
FIG. 3 is an exploded view showing the cryogenic coupler of FIG. 2 with the socket and plug separated from each other.

When the plug 11 is received in the opening of the socket 10, a gap 12 is left between the free end of plug 11 and the inner wall of the socket 10 which is opposite to the end of the plug 10. As particularly shown in FIG. 3, in a condition in which the plug 11 is disconnected from the socket 10, a seal assembly 13 is arranged in the gap 12. The seal assembly 13 serves to prevent undesirable leakage of the supply medium from the connection between the socket 10 and the plug 11. The seal assembly 13 includes a retainer ring 13a, a pair of resin seal rings 13b, and a metal seal ring 13c which is sandwiched by the resin seal rings 13b. The retainer ring 13a retains the seal rings 13b and 13c in position. The metal seal ring 13c has an annular ridge $t_1$ on its one side, and an annular recess $t_2$ on its opposite side. The annular ridge $t_1$ is tightly engageable with the sealing surface of one of the resin seal rings 13b, while the annular recess $t_2$ is tightly engageable with the sealing surface of the other resin seal ring 13b.

Figure 4:
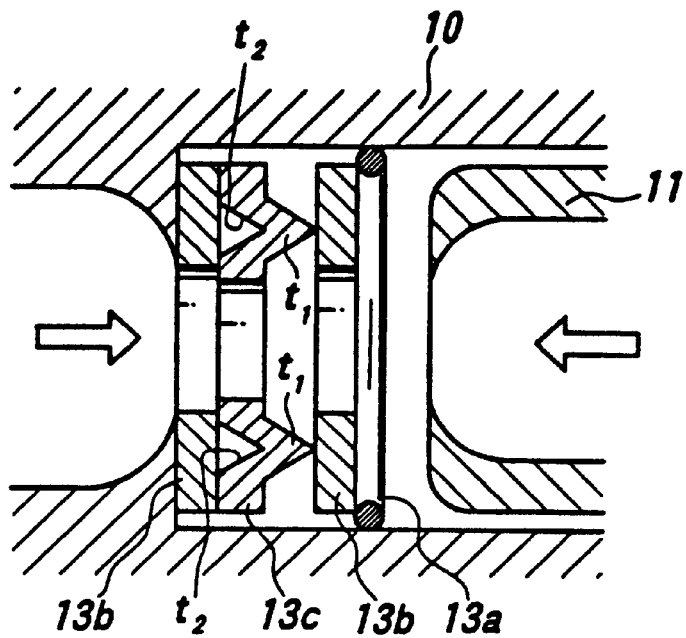
FIG. 4 is a sectional view showing one example of the seal assembly.

FIG. 4 is an enlarged view of the connection between the plug 11 and the socket 10. When the plug 11 and the socket 10 are connected to each other, the seal assembly 13 has a reduced thickness due to the compression of the seal rings 13b and 13c relative to each other. In this instance, the annular ridge $t_1$ on the metal seal ring 13c is forced into the adjacent resin seal ring 13b, while the resin seal ring 13b on the opposite side is partly forced into the annular recess $t_2$, thereby providing an improved sealing characteristic.

In the seal assembly 13 of the coupler according to the present invention, it is preferred that the seal ring retainer 13a comprises phosphor bronze having an improved machinability and a high resistance to corrosion due to moisture or the like. However, the material for the retainer ring 13a is not necessarily limited to phosphor bronze, provided that it is capable of retaining the seal rings by its own resilience in the opening of the socket 10, thereby ensuring that the seal rings are prevented from undesirable dislocation. The retainer ring 13a not only serve to retain the seal rings in position, but also provides an improved sealing effect since the retainer ring, per se, functions as a sort of seal ring. Furthermore, it is preferred that the resin seal rings 13b comprise fluorine resin, such as tetrafluoroethylene or trifluorochloroethylene. This type of fluorine resin is readily available on market, for example, as Teflon®. It is also preferred that the metal seal ring 13c comprises stainless steel, in particular austenite stainless steel (e.g., SUS304L), or copper or copper alloy. The thickness and the outer and inner diameters of each seal ring may be determined as appropriate, in accordance with the dimension of the gap 12 in the coupler.

Figure 5:
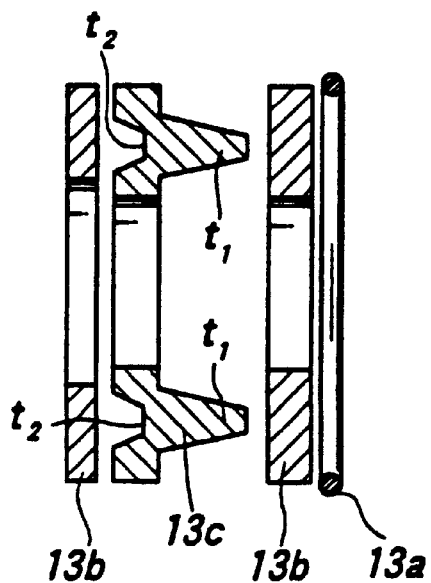
FIG. 5 is a sectional view showing another example of the seal assembly.
Figure 7A:
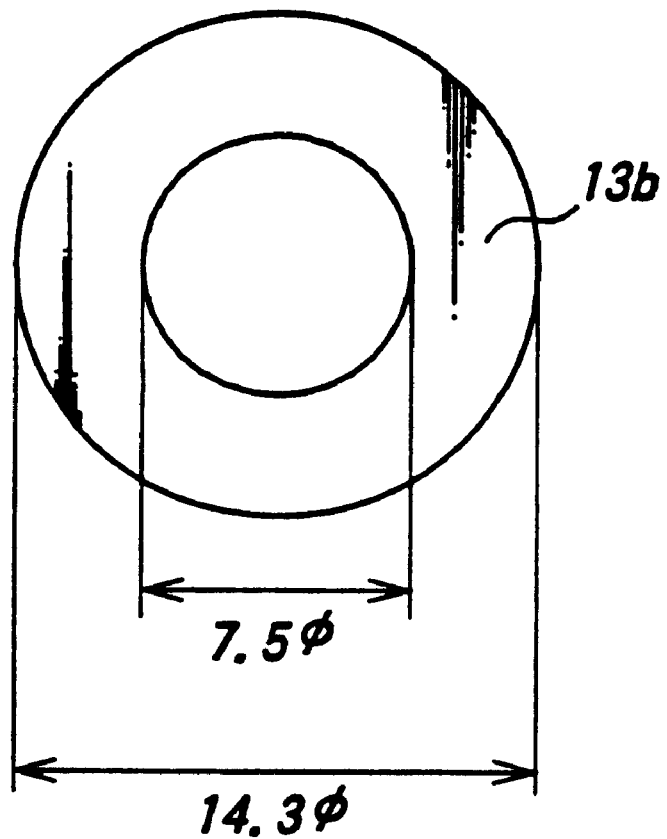
FIGS. 7a and 7b are front view and side view showing one example of the seal ring, respectively.
Figure 7B:
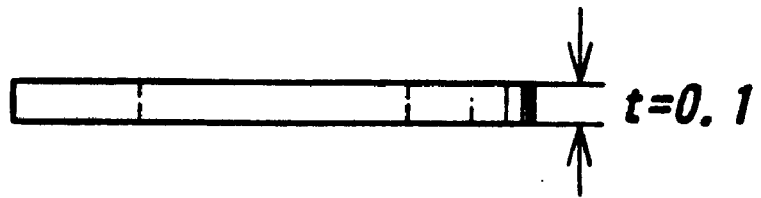
Figure 8A:
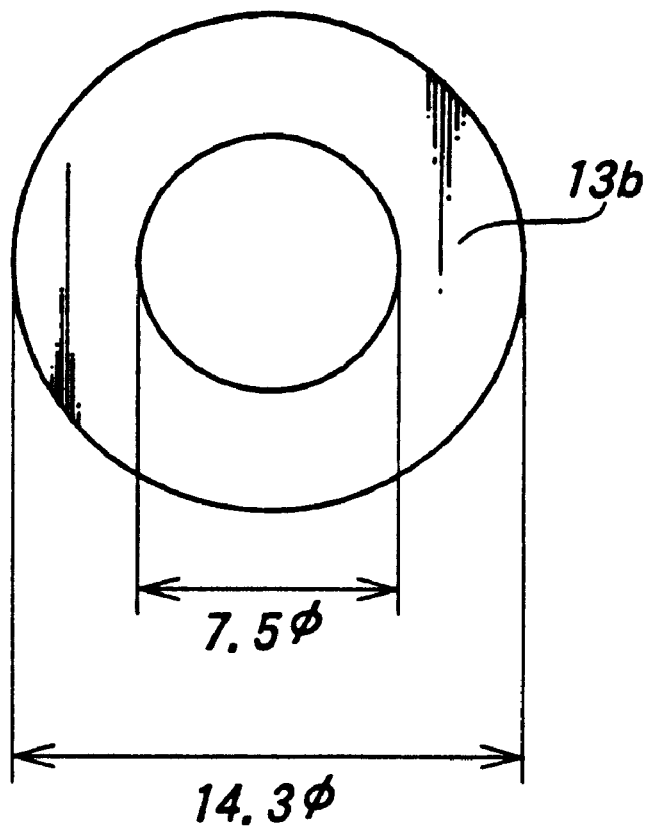
FIGS. 8a and 8b are front view and side view showing another example of the seal ring, respectively.
Figure 8B:
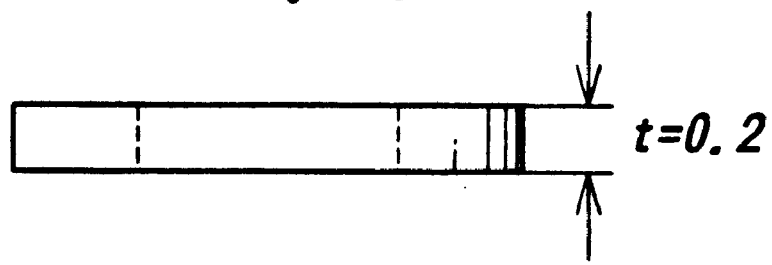
Figure 9A:
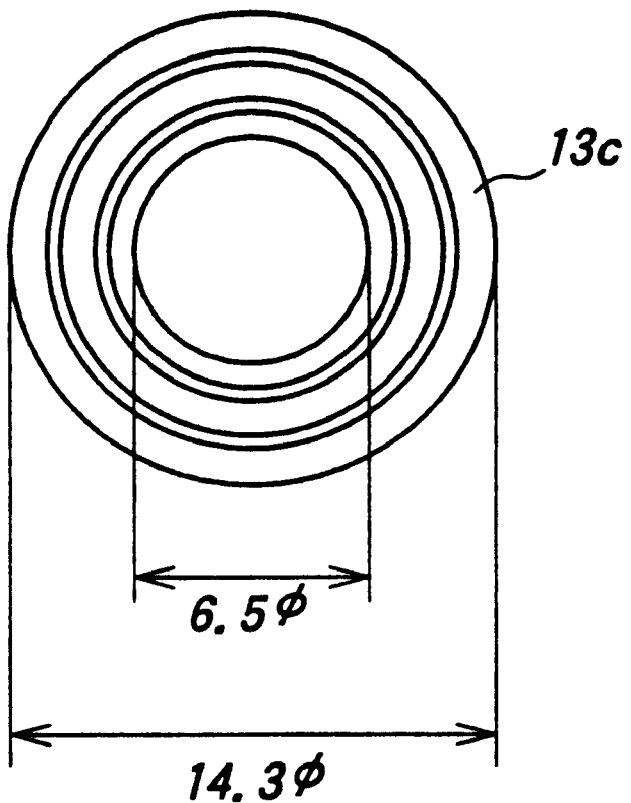
FIGS. 9a and 9b are front view and side view showing the metal seal ring, respectively.
Figure 9B:
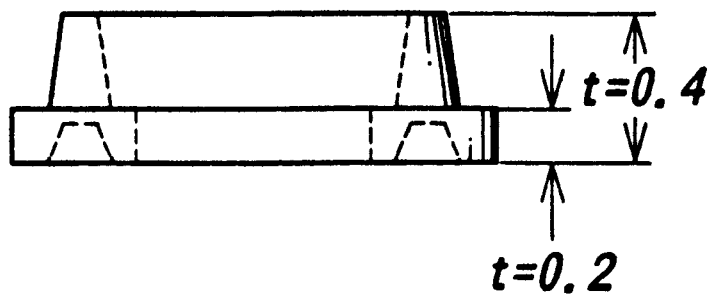
Figure 10A:
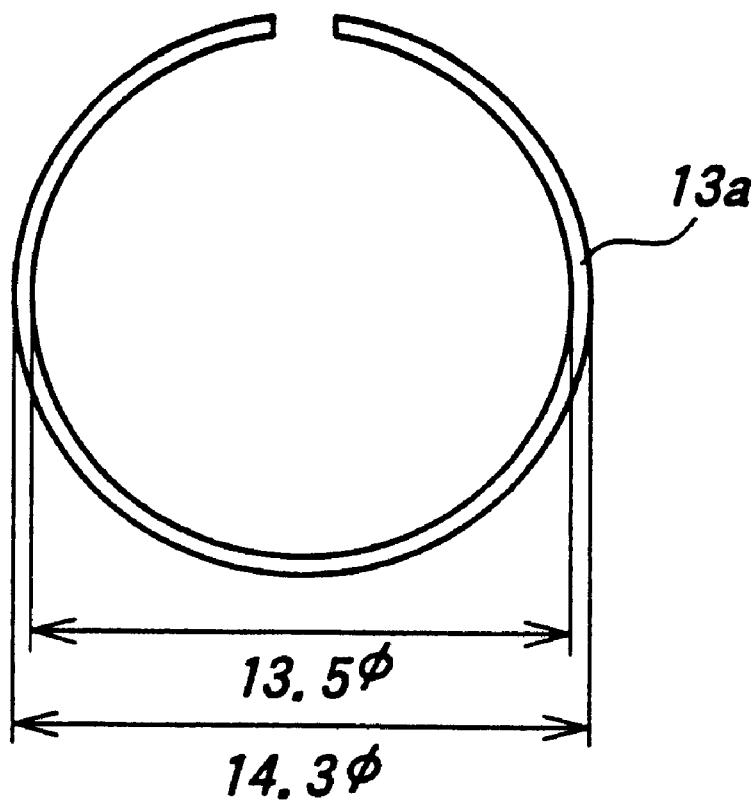
FIGS. 10a and 10b are front view and side view showing the retainer ring, respectively.
Figure 10B:

FIG. 5 shows a modified embodiment of metal seal ring 13c in the seal assembly 13. The annular ridge $t_1$ of the metal seal ring 13c may have a cross-section as shown in FIG. 5. It is also possible to provide two or more annular ridges $t_1$ which are arranged in concentric manner, in order to enhance the sealing performance. Both FIG. 2 and FIG. 5 show an embodiment in which the annular recess $t_2$ is provided on the opposite side of the annular projection $t_1$. Depending upon the operational conditions of the cryogenic coupler, it may be possible to reliably prevent leakage of the supply medium even without the annular recess $t_2$. However, the provision of the annular recess $t_2$ is preferred in that the metal seal ring itself functions as a spring to stably maintain the desired surface pressure, which is required for achieving the sealing function, even after repeated use of the coupler for a long period.

As shown in FIG. 2, the cryogenic coupler is provided with valve 10b and valve 11b as a means of blocking the passage of the supply medium when the plug is disconnected from the socket 10. These valves 10b, 11b each has a valve body as shown in FIGS. 6a and 6b. The valve body may be provided with a seal member $S_1$, such as an O-ring, to enhance the sealing function. It is highly preferred that the seal member $S_1$ comprises fluorine resin, such as Teflon®, in view of positive prevention of leakage of the supply medium leakage under a cryogenic temperature condition, and also in view of the compatibility of the material with the supply medium on the contact surfaces. The seal member $S_1$ has a cross-section which may be circular (FIGS. 2 and 3) or rectangular (FIG. 6a).

The cryogenic coupler according to the present invention is used by connecting the socket 10 and the plug 11 to each other, with the plug 11 received in the opening of the socket 10. In this instance, the dimension from the free end of the plug 11 to the abutment surface of the socket 10 may be 0.7 mm. The particulars of the seal rings 13b, 13c and the retainer ring 13a are shown in FIGS. 7a, 7b, FIGS. 8a, 8b, FIGS. 9a, 9b and FIGS. 10a, 10b. These elements are arranged in the gap 12 in the manner as shown in FIG. 5.

Investigations have been carried out to determine whether the leakage of liquefied helium from the coupler occurs while the liquefied helium is being supplied, with the passage extending to the socket 10 connected to a liquefied helium container and the plug 11 connected to a helium gas recovery passage, and to check the ease of connection and disconnection of the coupler at various temperatures.

For this investigation, a thermocouple (gold-iron/nickel-chromium alloy known as Chromel™) has been used to measure the temperature of the coupler. It was found that the coupler was under the temperature of 20–30K. The pressure in the helium gas recovery passage was also measured with a manometer, and it was found that the pressure during the supply of the medium was around 300 mm $H_2O$ on average and the maximum pressure was 800 mm $H_2O$ when the liquefied helium fills the container completely and begins to overflow.

A hand detector "CHECK B4" (manufactured by Edwards Corp.) was used to test for the leakage of the liquefied helium at different temperature levels of 130K, 120K, 100K, 70K and 20–30K. The results reveal that the leakage of the liquefied helium from the coupler could be positively prevented at any temperature level. It was thus possible to confirm the functional advantages and effectiveness of the cryogenic coupler according to the present invention.

Moreover, the socket and the plug were connected to, and disconnected from each other during the measurement when it was found that the operation could be readily carried out without any problems or difficulties. Repeated tests were carried out by connecting and disconnecting the coupler several hundreds of times when it was found that the sealing properties can be well maintained.

The present invention thus provides an improved cryogenic coupler which is capable of preventing leakage of the cryogenic medium to outside, when the passages in the socket and the plug are connected to each other, and which allows a facilitated connection and disconnection of the passages, even under a low temperature condition.

While the present invention has been described above with respect to specific embodiments, they have been presented by way of examples only, and various changes or alterations may be made without departing from the scope of the invention as defined by the appended claims.

What is claimed is:

1. A cryogenic coupler comprising:
    a socket having a first passage for a cryogenic medium passage, and an opening at one end thereof;
    a plug which can be inserted into said opening and thereby detachably connected to the socket, said plug having a second passage which is communicated with said first passage when the plug is connected to the socket;
    a first valve provided for the socket, for blocking the first passage when the plug is disconnected from the socket;
    a second valve provided for the plug, for blocking the second passage when the plug is disconnected from the socket; and
    a seal assembly arranged between opposite end surfaces of the socket and the plug in said opening, for preventing leakage of the cryogenic medium from said passages to outside when the plug is connected to the socket.

2. The cryogenic coupler according to claim 1, wherein said seal assembly comprises first and second resin seal rings which are engageable with said opposite end surfaces of the socket and the plug, respectively, a metal seal ring arranged between, and adjacent to, said first and second resin seal rings.

3. The cryogenic coupler according to claim 2, wherein said seal assembly further comprises a retainer ring engaged with an inner peripheral surface of said opening, for retaining said seal rings in said opening of the socket.

4. The cryogenic coupler according to claim 3, wherein said retainer ring comprises one of resin and metal.

5. The cryogenic coupler according to claim 2, wherein said metal seal ring has a surface provided with an annular ridge which is engaged with one of said first and second resin seal members.

6. The cryogenic coupler according to claim 2, wherein said metal seal ring has a surface provided with an annular groove which is engaged with one of said first and second resin seal members.

7. The cryogenic coupler according to claim 2, wherein said first and second resin seal rings comprise fluorine resin.

8. The cryogenic coupler according to claim 2, wherein said metal seal ring comprises one of stainless steel, copper and copper alloy.

* * * * *